US011272000B2

(12) United States Patent
Shobhana et al.

(10) Patent No.: US 11,272,000 B2
(45) Date of Patent: Mar. 8, 2022

(54) DOMAIN NAME SERVICE CACHING IN DISTRIBUTED SYSTEMS

(71) Applicant: Citrix Systems, Inc., Fort Lauderdale, FL (US)

(72) Inventors: Bhavana Shobhana, Bengaluru (IN); Vinay Shivananda, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/896,400

(22) Filed: Jun. 9, 2020

(65) Prior Publication Data

US 2021/0336925 A1    Oct. 28, 2021

(30) Foreign Application Priority Data

Apr. 28, 2020 (IN) .............................. 202041018176

(51) Int. Cl.
| | | |
|---|---|---|
| *H04L 29/08* | (2006.01) | |
| *H04L 67/1036* | (2022.01) | |
| *H04L 61/58* | (2022.01) | |
| *H04L 61/4552* | (2022.01) | |
| *H04L 12/18* | (2006.01) | |
| *H04L 61/5046* | (2022.01) | |
| *H04L 61/4511* | (2022.01) | |
| *H04L 67/568* | (2022.01) | |
| *H04L 61/5069* | (2022.01) | |
| *H04L 61/5007* | (2022.01) | |

(52) U.S. Cl.
CPC ...... *H04L 67/1036* (2013.01); *H04L 61/1552* (2013.01); *H04L 61/6009* (2013.01); *H04L 12/18* (2013.01); *H04L 12/1881* (2013.01); *H04L 29/12066* (2013.01); *H04L 29/12132* (2013.01); *H04L 61/1511* (2013.01); *H04L 61/2007* (2013.01); *H04L 61/2046* (2013.01); *H04L 61/2069* (2013.01); *H04L 67/2842* (2013.01)

(58) Field of Classification Search
CPC ............. H04L 61/1511; H04L 61/6009; H04L 61/1552; H04L 61/2046; H04L 61/2069; H04L 67/1036; H04L 67/2842; H04L 29/12066; H04L 29/12132; H04L 61/2007; H04L 12/18; H04L 12/1881
See application file for complete search history.

(56) References Cited

U.S. PATENT DOCUMENTS

| | | | | |
|---|---|---|---|---|
| 8,606,926 B2 * | 12/2013 | Ulevitch | ............. | H04L 61/1552 709/227 |
| 10,375,016 B1 * | 8/2019 | Vavrusa | ............. | H04L 67/1036 |

* cited by examiner

*Primary Examiner* — Kyung H Shin
(74) *Attorney, Agent, or Firm* — Foley & Lardner LLP

(57) ABSTRACT

Systems and methods for domain name system (DNS) caching in a distributed processing engine include a first processing engine which may receive a DNS request for accessing a domain from a client. The first processing engine may generate a DNS query for a DNS controller based on the DNS request. The first processing engine may receive a DNS record corresponding to the domain from the DNS controller. The first processing engine may store data corresponding to the DNS record in cache of the first processing engine. The first processing engine may transmit a message including data corresponding to the DNS record for the domain to a second processing engine, to cause the second processing engine to store data corresponding to the DNS record in cache of the second processing engine.

20 Claims, 8 Drawing Sheets

DOMAIN NAME SERVICE CACHING IN DISTRIBUTED SYSTEMS

CROSS-REFERENCE TO RELATED APPLICATIONS

The present application claims the benefit of and priority to Indian Provisional Patent Application No. 202041018176, entitled "DNS CACHING IN A DISTRIBUTED DNS PROCESSING ENGINE," filed Apr. 28, 2020, the entirety of which is incorporated by reference herein.

FIELD OF THE DISCLOSURE

The present application generally relates to domain name service (DNS) caching, including but not limited to systems and methods for DNS caching in a distributed DNS processing engine.

BACKGROUND

Clients or processing engines may generate various DNS queries for DNS resolvers to access domains corresponding to various resources hosted on servers. The DNS resolvers may respond with DNS records. However, since many clients and/or processing engines may generate similar (or the same) DNS requests, the DNS resolvers may be inundated with duplicative DNS requests, which may cause latency in responses and may thereby cause performance at less than desired specifications.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for DNS caching are described herein. More particularly, the systems and methods described herein may share cached DNS records amongst processing engines in a distributed DNS processing engine environment.

A domain name service or system (DNS) is a solution to resolve a domain name to a reachable address on the internet. Typically, a DNS request is sent to an authoritative nameserver which maps DNS requests to a corresponding DNS record. In some systems, there may be authoritative nameservers distributed across the internet to avoid bottlenecking. Additionally, some systems may include proxies which cache DNS records received from the nameservers (e.g., until an expiry interval, such as indicated in a time-to-live (TTL) value). Such proxies may cache the DNS records to server subsequent DNS requests (rather than incurring latency from the authoritative nameservers).

Some systems may leverage a distributed DNS processing engine system, where a group of DNS processing engines are located within the same host or hosts in the same subset(s). In such an environment, each DNS processing engine independently caches the DNS records for the queries it received. Since there may be multiple requests to different DNS processing engines for the same domain, there may be duplicated cache in each of the DNS processing engine. Such implementations may result in increased DNS requests for the nameserver, which may translate to more nameserver instances to satisfy the increased DNS requests (thereby increasing the operational costs). Furthermore, such implementations may increase the overhead on the backend server and proxies in terms of processing of request/response. The DNS server may also buffer more requests due to duplicative requests, which may result in increased latency for the clients in loading the application (e.g., due to the delay in resolving the domain name). Also, by having increased requests, the DNS processing engine and DNS server(s) may have overall increased bandwidth usage (e.g., on the DNS processing engine-to-server path). Some DNS servers may drop some DNS queries due to request rate limiting, which may further increase latency. Lastly, since DNS processing engines cache DNS records separately, and may cache the DNS records at different times and with different TTL values, there may be inconsistencies in the DNS cache of each of the DNS processing engines.

In one aspect, this disclosure is directed to a method. The method includes receiving, by a first processing engine from a client, a domain name service (DNS) request for accessing a domain. The method includes generating, by the first processing engine, a DNS query for a DNS controller based on the DNS request. The method includes receiving, by the first processing engine from the DNS controller, a DNS record corresponding to the domain. The method includes storing, by the first processing engine, data corresponding to the DNS record in cache of the first processing engine. The method includes transmitting, by the first processing engine to a second processing engine, a message including data corresponding to the DNS record for the domain, to cause the second processing engine to store data corresponding to the DNS record in cache of the second processing engine.

In some embodiments, transmitting the message includes transmitting, by the first processing engine to a plurality of second processing engines including the second processing engine, a message including data corresponding to the DNS record for the domain, to cause each of the plurality of second processing engines to store data corresponding to the DNS record in cache of the respective second processing engine. In some embodiments, the method further includes transmitting, by the first processing engine, the DNS record from the DNS controller to the client.

In some embodiments, the client is a first client. The method may further include receiving, by the first processing engine from a second client, a second DNS query to access the domain. The method may further include performing, by the first processing engine, a look-up in the cache of the first processing engine to identify the DNS record for the domain. The method may further include transmitting, by the first processing engine to the second client, the DNS record for the domain. In some embodiments, the domain is a first domain. The method may further include receiving, by the first processing engine from the second processing engine, a broadcast message including data corresponding to a second DNS record for a second domain. The method may further include storing, by the first processing engine, the data corresponding to the second DNS record in the cache of the first processing engine. In some embodiments, the client is a first client. The method may further include receiving, by the first processing engine from a second client, a DNS request to access the second domain. The method may further include performing, by the first processing engine, a look-up in the cache of the first processing engine, to identify the second DNS record for the second domain. The method may further include transmitting, by the first processing engine, the second DNS record to the second client.

In some embodiments, the first processing engine stores the DNS record with a timestamp. The method may further include determining, by the first processing engine, an expiration time for the DNS record based on the timestamp. The method may further include transmitting, by the first processing engine to the DNS controller, a request to update the DNS record based on the expiration time. The method may further include receiving, by the first processing engine from the DNS controller, an updated DNS record corresponding to the domain. The method may further include storing, by the first processing engine, the updated DNS record in cache. In some embodiments, the message is a first message. The method may further include broadcasting, by the first processing engine to the second processing engine, a second message including data corresponding to the updated DNS record for the domain, to cause the plurality of second processing engines to store the updated DNS record in cache.

In some embodiments, the first processing engine stores the DNS record with a timestamp. The method may further include determining, by the first processing engine, an expiration time for the DNS record based on the timestamp. The method may further include removing, by the first processing engine, the DNS record from the cache of the first processing engine based on the expiration time. The method may further include receiving, by the first processing engine from the second processing engine, an updated DNS record corresponding to the domain. The method may further include storing, by the first processing engine, the updated DNS record in cache. In some embodiments, the method further includes performing, by the first processing engine in response to receiving the request, a look-up using data corresponding to the domain in cache, to determine if data corresponding to the DNS record for the domain was received from one of the second processing engines. In some embodiments, the look-up is a first look-up. The method may further include performing, by the first processing engine in response to generating the DNS query for the DNS controller, a second look-up in the cache to determine if data corresponding to the DNS record for the domain was received from one of the second processing engine in response to receiving the DNS record from the DNS controller.

In another aspect, this disclosure is directed to a system. The system includes a first processing engine of a distributed set of processing engines. The first processing engine is configured to receive, from a client, a domain name service (DNS) request for accessing a domain. The first processing engine is configured to generate a DNS query for a DNS controller based on the DNS request. The first processing engine is configured to receive, from the DNS controller, a DNS record corresponding to the domain. The first processing engine is configured to store data corresponding to the DNS record in cache of the first processing engine. The first processing engine is configured to transmit, to a second processing engine, a message including data corresponding to the DNS record for the domain, to cause the second processing engine to store data corresponding to the DNS record in cache of the second processing engine.

In some embodiments, transmitting the message includes transmitting, to a plurality of second processing engines including the second processing engine, a message including data corresponding to the DNS record for the domain, to cause each of the plurality of second processing engines to store data corresponding to the DNS record in cache of the respective second processing engine. In some embodiments, the client is a first client. The first processing engine may be configured to receive, from a second client, a second DNS query to access the domain. The first processing engine may be configured to perform a look-up in the cache of the first processing engine to identify the DNS record for the domain. The first processing engine may be configured to transmit, to the second client, the DNS record for the domain.

In some embodiments, the domain is a first domain. The first processing engine may be configured to receive, from the second processing engine, a broadcast message including data corresponding to a second DNS record for a second domain. The first processing engine may be configured to store the data corresponding to the second DNS record in the cache of the first processing engine. In some embodiments, the client is a first client. The first processing engine may be configured to receive, from a second client, a DNS request to access the second domain. The first processing engine may be configured to perform a look-up in the cache of the first processing engine, to identify the second DNS record for the second domain. The first processing engine may be configured to transmit the second DNS record to the second client.

In some embodiments, the first processing engine stores the DNS record with a timestamp. The first processing engine may be configured to determine an expiration time for the DNS record based on the timestamp in cache. The first processing engine may be configured to transmit, to the DNS controller, a request to update the DNS record based on the expiration time. The first processing engine may be configured to receive, from the DNS controller, an updated DNS record for the domain. The first processing engine may be configured to store the updated DNS record in cache. In some embodiments, the message is a first message. The first processing engine may be configured to broadcast, to the second processing engine, a second message including data corresponding to the updated DNS record for the domain, to cause the plurality of second processing engines to store the updated DNS record in cache.

In some embodiments, the first processing engine may be configured to perform, in response to receiving the request, a first look-up using data corresponding to the domain in cache, to determine if data corresponding to the DNS record for the domain was received from one of the second processing engines. The first processing engine may be configured to perform, in response to generating the DNS query for the DNS controller, a second look-up in the cache to determine if data corresponding to the DNS record for the domain was received from one of the second processing engine in response to receiving the DNS record from the DNS controller. In some embodiments, the first processing engine stores the DNS record with a timestamp. The first processing engine may be configured to determine an expiration time for the DNS record based on the timestamp in cache. The first processing engine may be configured to remove the DNS record from the cache of the first processing engine based on the expiration time. The first processing engine may be configured to receive, from the second processing engine, an updated DNS record corresponding to the domain. The first processing engine may be configured to store the updated DNS record in cache.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements.

Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for domain name system (DNS) caching in a distributed DNS processing engine.

A. Network and Computing Environment

Figure 1A:
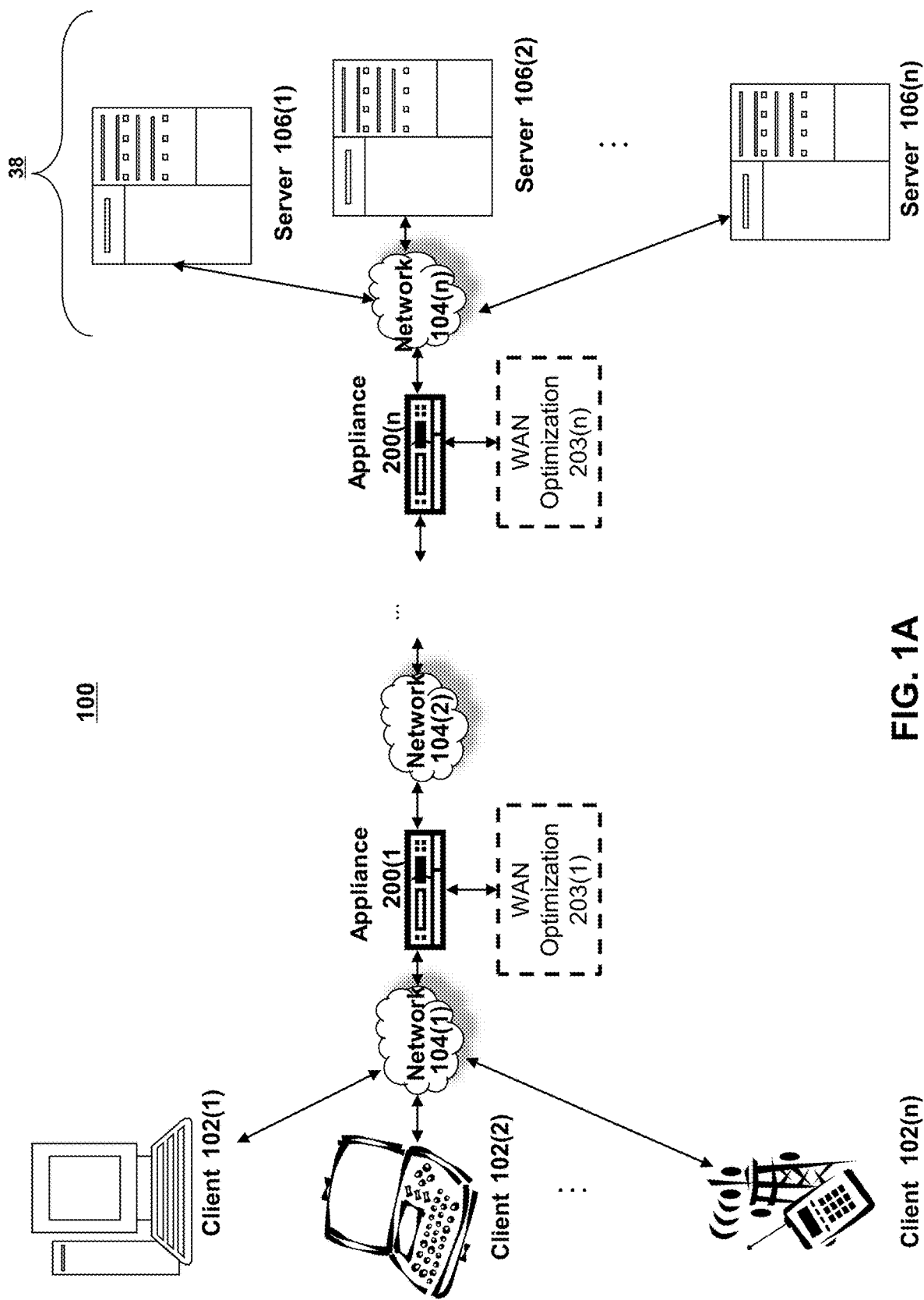
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
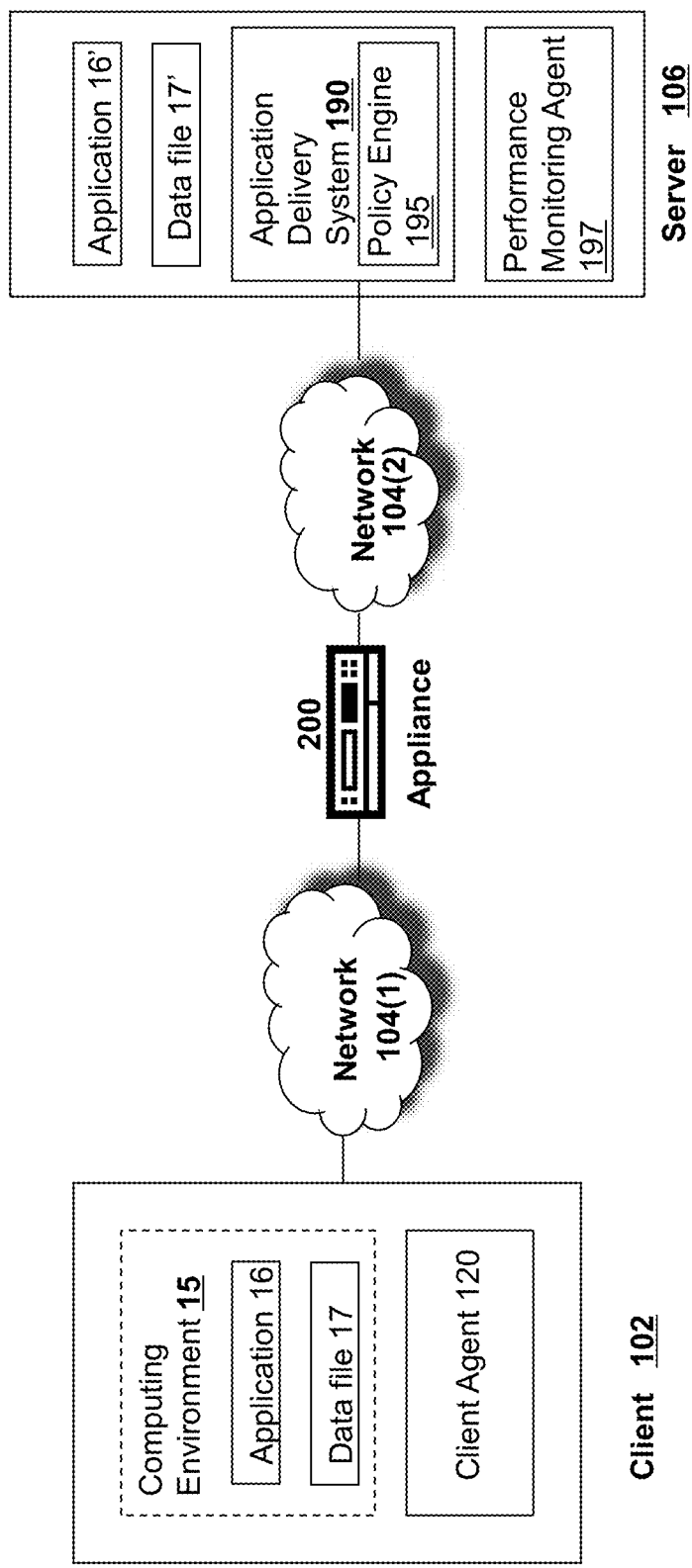
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
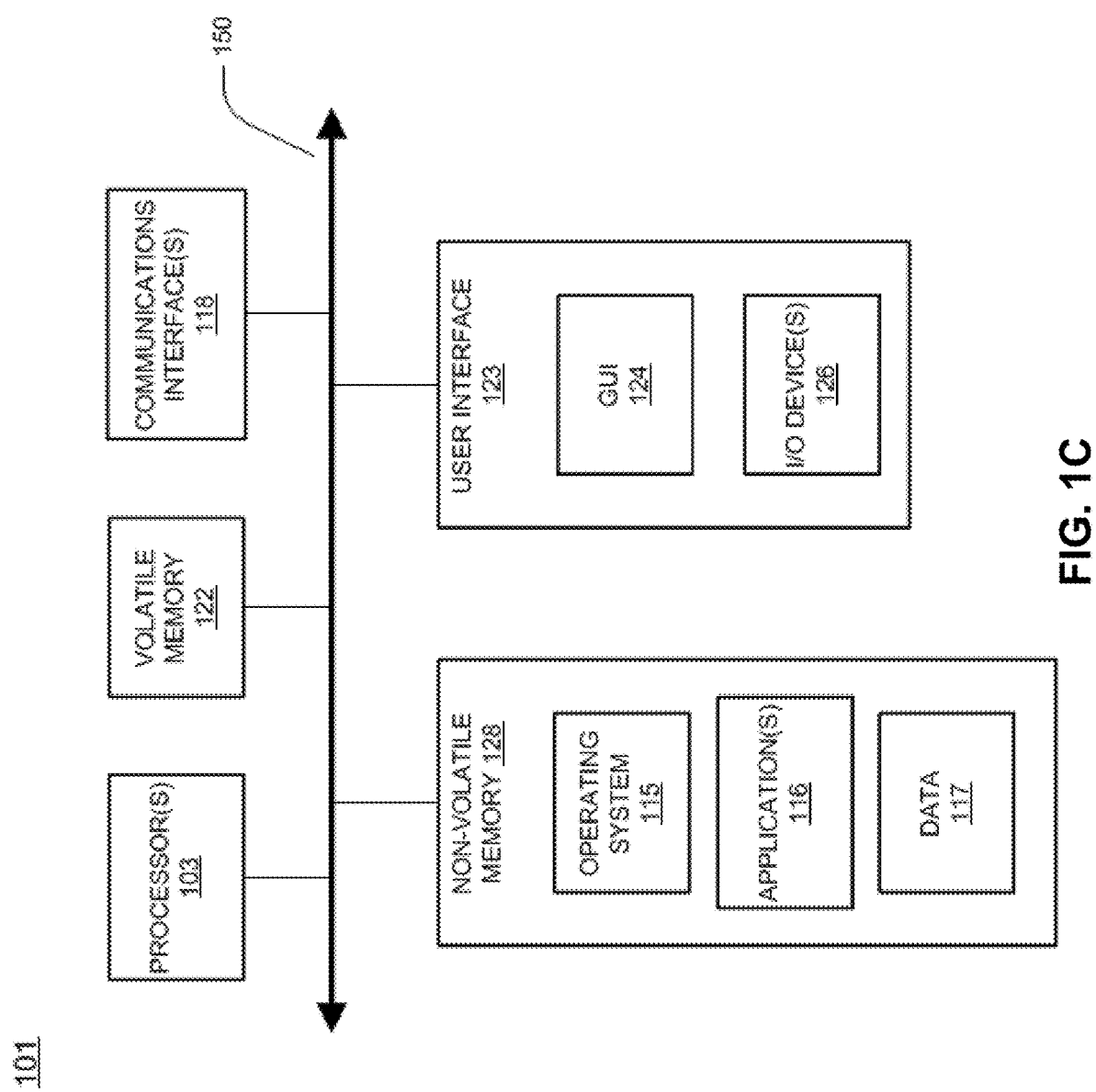
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150.

User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
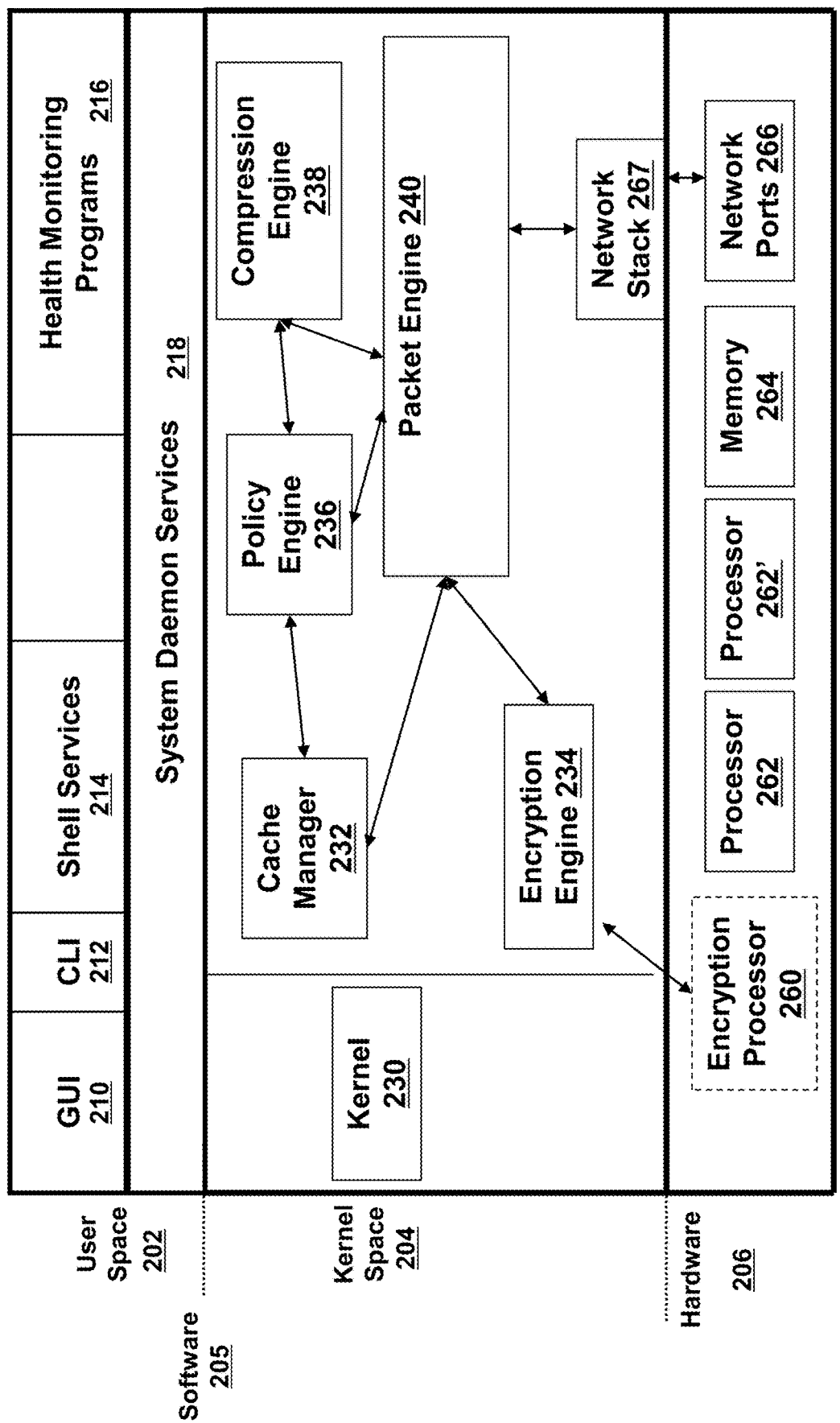
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
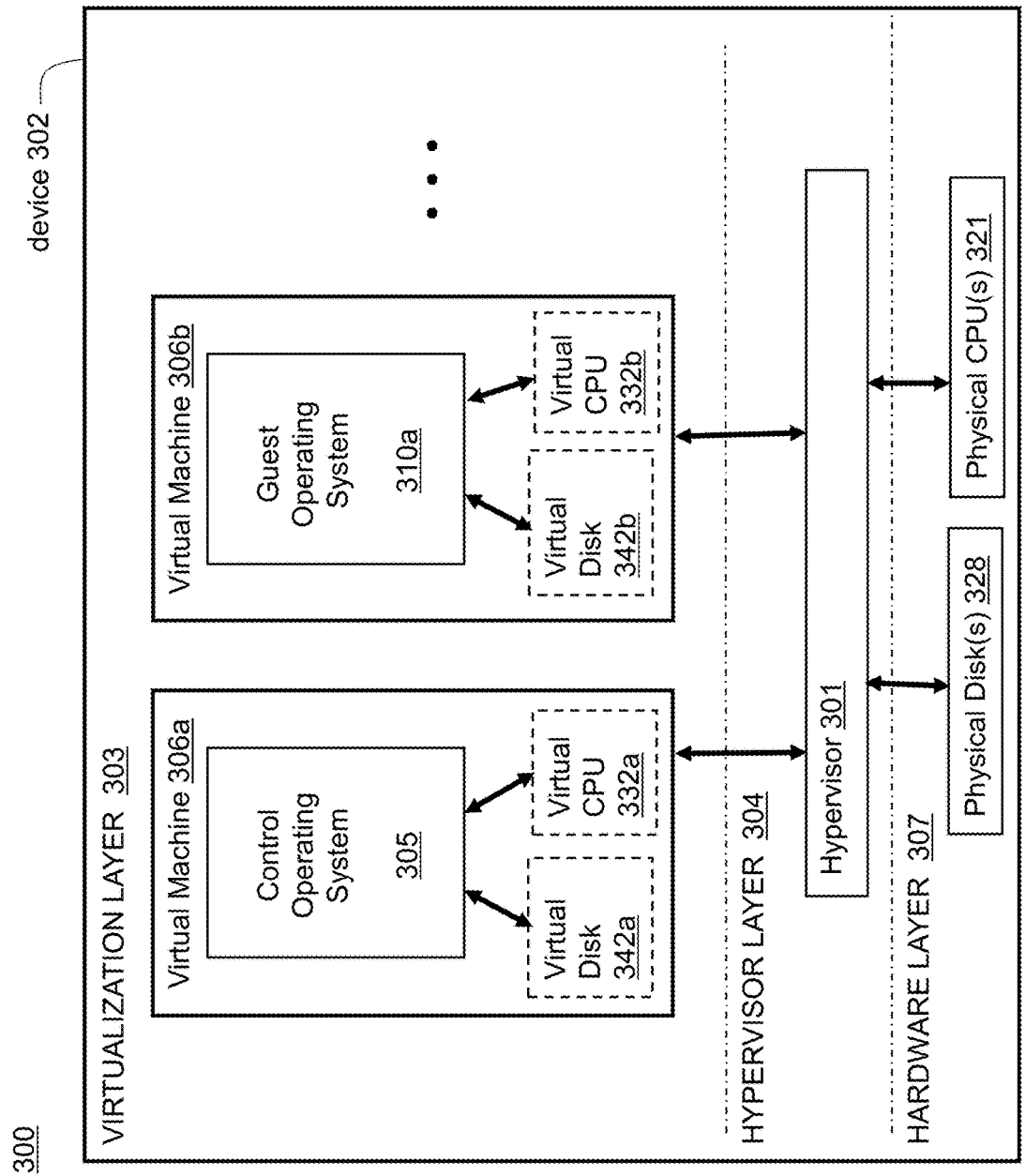
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
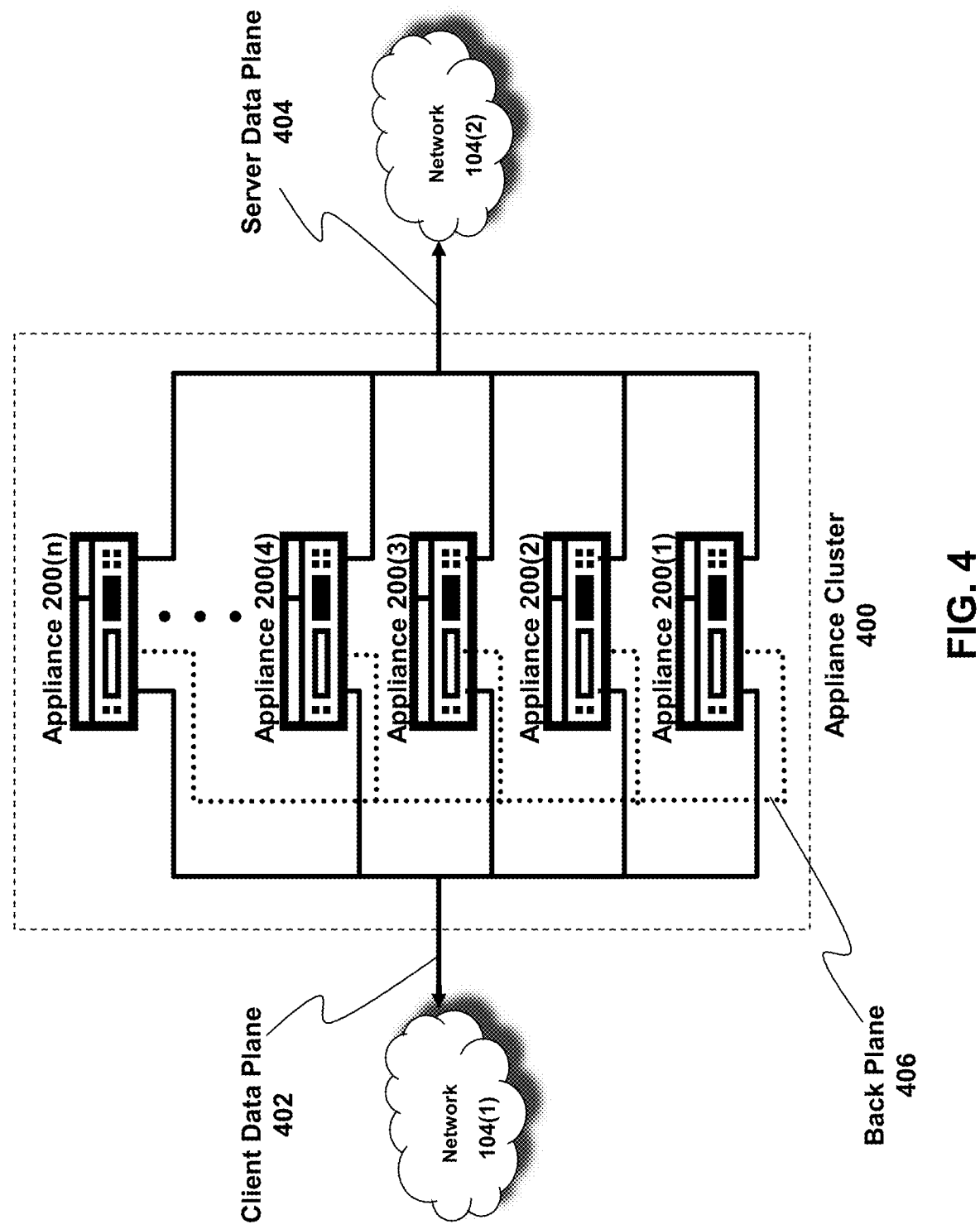
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Domain Name System (DNS) Caching in a Distributed DNS Processing Engine Systems and methods for DNS caching are described herein. More particularly, the systems and methods described herein may share cached DNS records amongst processing engines in a distributed DNS processing engine environment.

A domain name system (DNS) is a solution to resolve a domain name to a reachable address on the internet. Typically, a DNS request is sent to an authoritative nameserver which maps DNS requests to a corresponding DNS record. In some systems, there may be authoritative nameservers distributed across the internet to avoid bottlenecking. Additionally, some systems may include proxies which cache DNS records received from the nameservers (e.g., until an expiry interval, such as indicated in a time-to-live (TTL) value). Such proxies may cache the DNS records to service subsequent DNS requests (rather than incurring latency from the authoritative nameservers).

Some systems may leverage a distributed DNS processing engine system, where a group of DNS processing engines are located within the same host or hosts in the same subset(s). In such an environment, each DNS processing engine independently caches the DNS records for the queries it received. Since there may be multiple requests to different DNS processing engines for the same domain, there may be duplicated cache in each of the DNS processing engine. Such implementations may result in increased DNS requests for the nameserver, which may translate to more nameserver instances to satisfy the increased DNS requests (thereby increasing the operational costs). Furthermore, such implementations may increase the overhead on the backend server and proxies in terms of processing of request/response. The DNS server may also buffer more requests due to duplicative requests, which may result in increased latency for the clients in loading the application (e.g., due to the delay in resolving the domain name). Also, by having increased requests, the DNS processing engine and DNS server(s) may have overall increased bandwidth usage (e.g., on the DNS processing engine-to-server path). Some DNS servers may drop some DNS queries due to request rate limiting, which may further increase latency. Lastly, since DNS processing engines cache DNS records separately, and may cache the DNS records at different times and with different TTL values, there may be inconsistencies in the DNS cache of each of the DNS processing engines.

To address the aforementioned drawbacks, the systems and methods described herein include a DNS processing engine that receives a DNS request for accessing a domain from a client. The DNS processing engine generates a DNS query for a DNS controller based on the DNS request. The DNS processing engine receives a DNS record corresponding to the domain from the DNS controller. The DNS processing engine stores data corresponding to the DNS record in cache of the first processing engine. The DNS processing engine transmits a message to other DNS processing engines in a distributed DNS processing engine framework. The message includes data corresponding to the DNS record for the domain name. The other DNS processing engines then store the data corresponding to the DNS record in their respective cache.

According to the implementations and embodiments described herein, the present disclosure provides faster access (e.g., by having reduced latency) to applications and websites for clients, since DNS records are cached by the DNS processing engines. The present disclosure provides reduced load on upstream nameservers, which may lead to less throttling. Additionally, the present disclosure provides for lower processing overhead on the distributed processing engine systems, since DNS response validation is performed on one of the processing engines (rather than on multiple processing engines). The implementations and embodiments described herein may provide for reduced DNS attacks (such as, for example, flooding a nameserver with arbitrary DNS queries), since only one request is sent to the nameserver and all other DNS processing engines respond from cache. Furthermore, since each of the processing engines in the distributed processing engine system broadcast responses, the DNS cache may be consistent across the processing engines. The systems and methods described herein may have lower overhead on DNS processing engine to DNS processing engine communications by limiting the broadcasting of DNS records (e.g., by providing proactive updates from different processing engines). The systems and methods described herein may reduce load on a backend nameserver and the backplane traffic when a new DNS processing engine is added into the distributed system. Furthermore, the systems and methods described herein may be applicable to all the DNS modes (e.g., proxy mode, recursive nameserver mode, forwarder mode, etc.). Various other benefits of the systems and methods described herein will become apparent as follows.

Figure 5:
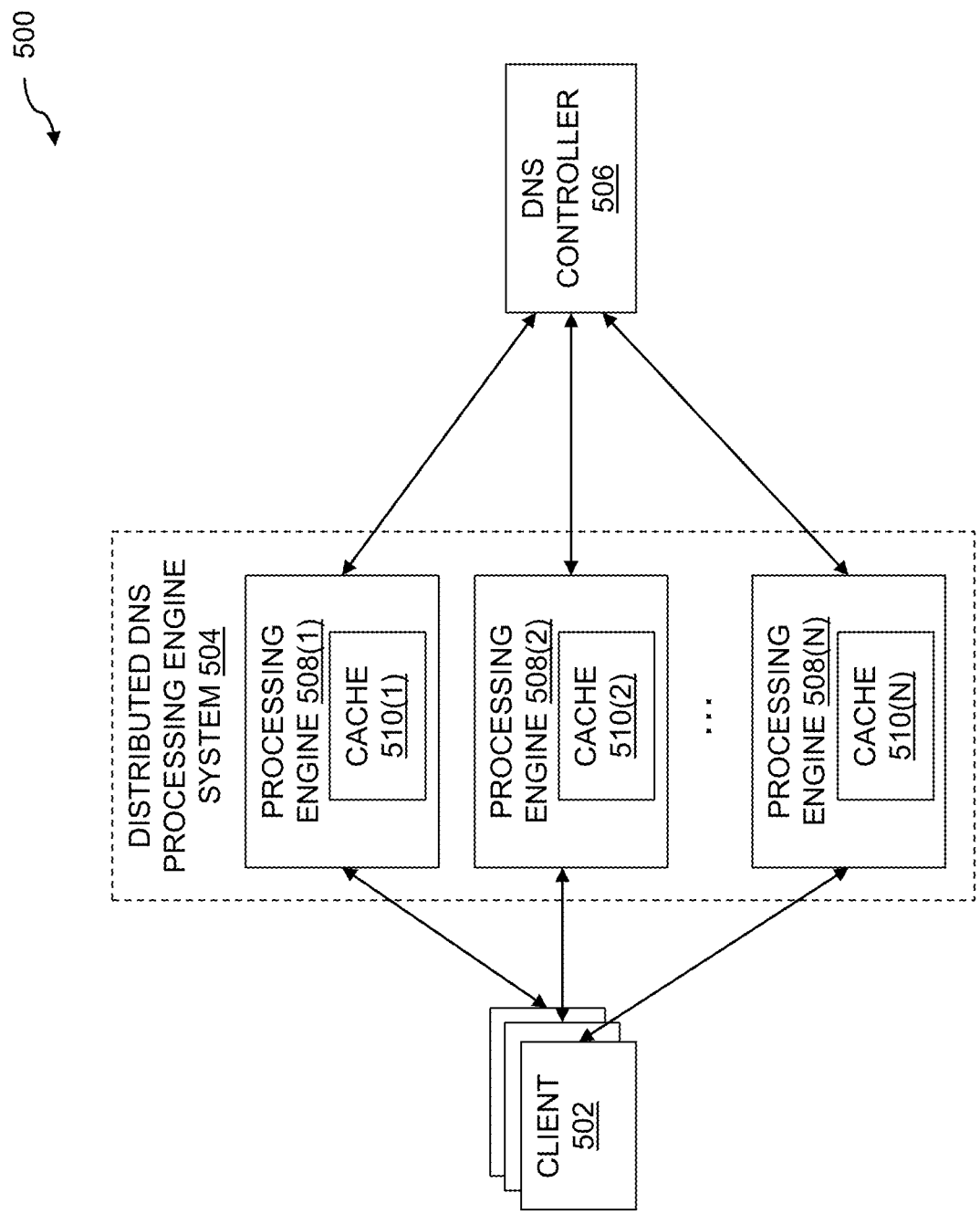
FIG. 5 is a block diagram of a system for DNS caching in a distributed DNS processing engine, in accordance with an illustrative embodiment.

Referring now to FIG. 5, depicted is a block diagram of a system 500 for domain name system (DNS) caching in a distributed processing engine, according to an illustrative embodiment. The system 500 is shown to include a plurality of clients 502, a distributed DNS processing engine system 504, and a DNS controller 506. The distributed DNS processing engine system 504 may include a plurality of processing engines 508, each of which include a cache 510. A processing engine 508 may be configured to receive a DNS request from a client 502 for accessing a domain (e.g., hosted on a server). The processing engine 508 may be configured to generate a DNS query for the DNS controller 506 based on the DNS request from the client 502. The processing engine 508 may be configured to receive a DNS record corresponding to the domain from the DNS controller 506. The processing engine 508 may be configured to store data corresponding to the DNS record in cache 510. The processing engine 508 may be configured to transmit a message including data corresponding to the DNS record for the domain name to other processing engines 508 in the distributed DNS processing engine system 504. The processing engines 508 may store data corresponding to the DNS record in their respective cache 510.

The systems and methods of the present solution may be implemented in any type or form of device, including clients, servers or appliances described above with reference to FIG. 1A-FIG. 4. For instance, the processing engines 508 may be implemented as embodied upon or otherwise incorporated into an appliance 200 described above with reference to FIG. 2-FIG. 4. The clients 502 may be similar in some respects to the clients 102 described above with respect to FIG. 1A-FIG. 1B. The clients 502 may request access to a domain (e.g., a website, application, service, etc.) corresponding to a server, which may be similar in some respects to the server 106 described above with respect to FIG. 1A-FIG. 1B. In some implementations, the DNS controller 506 may be embodied upon, incorporated into, or a component of an appliance 200, a server 106, etc. In other words, the clients 502, processing engines 508, and/or the DNS controller 506 may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

The clients 502 may be similar to the clients 102 described above with respect to FIG. 1A-FIG. 1B. The clients 502 may be personal computers, laptops, desktops, tablets, mobile devices, etc. The clients 502 may be configured to access services, websites, webpages, applications, etc. corresponding to a domain hosted on various servers. The clients 502 may be configured to access the domain by generating a DNS requests for a processing engine (e.g., client requests to access the service 510). The clients 502 may be configured to generate the DNS requests when a user selects a service, launches a service, provides a uniform resource locator (URL) address to a browser, etc. The DNS request may include, for instance, the URL address for the domain, a domain name, etc. The clients 502 may be configured to transmit, send, or otherwise provide the DNS requests to a processing engine device 502 for routing to a corresponding version of the service 510. In some embodiments, some clients 502 may route DNS requests to some processing engines 508 and some clients 502 may route DNS requests to other processing engines 508. For example, clients 502 may route DNS requests to dedicated processing engines 508 (e.g., processing engines 508 located on premises for the clients 502), clients 502 may route DNS requests to processing engines 508 based on proximity (e.g., whereby clients 502 route DNS requests to a processing engine 508 which is in closest proximity to the client 502), and so forth. As described in greater detail below, the processing engines 508 may be configured to use the DNS requests for identifying a DNS record (corresponding to the target domain) for the client 502.

The system 500 is shown to include a distributed DNS processing engine system 504 including a plurality of processing engines 508. The DNS processing engine system 504 may be arranged intermediary to the clients 502 and a DNS controller 506. The processing engines 508 may be similar in some respects to the appliances 200 described above with reference to FIG. 2 and FIG. 4. In some embodiments, the arrangement shown in FIG. 5 may be similar in some regards to the arrangement shown in FIG. 4. Each of the processing engines 508 may be communicably coupled to one another within the distributed processing engine system 504. Additionally, the processing engines 508 may be communicably coupled to the client(s) 502 and the DNS controller 506. The processing engines 508 may facilitate communications between the client(s) 502 and server(s) 508. The processing engines 508 may be configured to generate DNS queries for the DNS controller 506. The processing engines 508 may be configured to generate DNS queries based on DNS requests received from the clients 502. In some embodiments, the processing engines 508 may be configured to generate DNS queries corresponding to a service 510 for managing network traffic between different versions of the service 510, as described in greater detail below.

The system 500 may include the DNS controller 506. The DNS controller 506 may be communicably coupled (e.g., via one or more network, internet, or other type/form of connection) to the processing engines 508. The DNS controller 506 may be the same as or similar to a DNS resolver, a DNS root server, an authoritative nameserver, and/or other type of DNS server. The DNS controller 506 may be configured to receive DNS queries from the processing engines 508. The DNS controller 506 may be configured to resolve the DNS queries by transmitting a DNS record corresponding to the DNS query to the corresponding processing engine 508. The DNS records may include, among other data, an internet protocol (IP) address (or other type of address) corresponding to the target domain. The DNS controller 506 may be configured to generate, maintain, establish, create, or otherwise include DNS records corresponding to service(s), website(s), webpage(s), application(s), etc. (collectively referred to a "service" or "services") associated with various domains hosted on various servers. The DNS controller 506 may be configured to generate DNS records for services hosted on a server as new services (and new versions of previous services) are deployed at the server. Hence, as new services are registered with the DNS controller 506, the DNS controller 506 may generate new DNS records or update previous versions of DNS records.

The processing engines 508 may be configured to receive DNS requests from the clients 502 for accessing a service. The processing engines 508 may be configured to generate a DNS query based on a corresponding DNS request from a client 502. In some embodiments, the DNS query may be similar in some respects to the DNS request. For example, the DNS query may include the domain name, data corresponding to the client 502 which generated the DNS request, a timestamp, etc. Hence, the processing engines 508 may be configured to generate the DNS queries based on the DNS requests from the clients 502. In some embodiments, the DNS queries may be substantially the same as (or the same as) the DNS requests. For example, the processing engines 508 may be configured to use the DNS request as the DNS query. The processing engine 508 may be configured to transmit, send, communicate, or otherwise provide the DNS query to the DNS controller 506.

The processing engines 508 may be configured to receive a response from the DNS controller 506. In some embodiments, the response may be a DNS record corresponding to the domain. In some embodiments, the response may be data corresponding to the DNS record. The processing engines 508 may be configured to transmit, forward, or otherwise provide the DNS record (or data corresponding to the DNS record) to the client 502 which generated the DNS request. The client 502 may correspondingly access the domain using the data from the DNS record (e.g., the IP address, for example).

Each of the processing engines 508 are shown to include a respective cache 510. The processing engines 508 may be configured to store data corresponding to the DNS records in cache 510. In some embodiments, the processing engines 508 may store the data corresponding to the DNS record in cache 510 indefinitely. In some embodiments, the processing engines 508 may store the data corresponding to the DNS record in cache 510 for a predetermined duration (e.g., corresponding to a time to live (TTL) value). The processing engines 508 may be configured to leverage the data in cache 510 for responding to subsequent DNS requests. For example, a processing engine 508 receives a DNS request for a domain from a client 502 in which the processing engine 508 previously generated a DNS query and received a DNS record, the processing engine 508 may be configured to generate and transmit a response to the DNS request with data from cache 510 (e.g., rather than waiting for a response from the DNS controller 506). The processing engine 508 may be configured to perform a look-up in cache 510 using data from the DNS request (such as the URL, the host name, etc.) to determine if the cache 510 includes data (e.g., an IP address) corresponding to the DNS request. Where the processing engine 508 identifies data in cache 510 corresponding to the DNS request, the data processing engine 508 may be configured to assemble, build, construct, or otherwise generate a response to the DNS request (e.g., using the data from cache 510). The data processing engine 508 may be configured to transmit the response to the DNS request to the client 502.

The processing engines 508 may be configured to generate a message for each of the other processing engines 508 within the distributed DNS processing engine system 504. The processing engine 508 which received a DNS record from the DNS controller 506 may be configured to generate the message. The message may include data corresponding to the DNS record from the DNS controller 506. The message may include, for example, the answer (e.g., the IP address) and an additional field from the DNS response. The additional field may include, for example, data corresponding to the DNS query, the DNS request, the domain, etc. Such embodiments may reduce bandwidth by limiting the amount of information contained in the message. In some embodiments, the message may include additional information. For example, the message may include the DNS record and a timestamp (e.g., a time in which the DNS record was received from the DNS controller 506). In some embodiments, the message may include the data which is saved in cache 510 by the processing engine 508. As described in greater detail below, the message may be structured such that other processing engine(s) 508 may be configured to save data corresponding to the DNS record in their respective cache 510.

The processing engine 508 may be configured to broadcast, send, provide, or otherwise transmit the message to other processing engine(s) 508 within the distributed DNS processing engine system 504. The processing engine 508 may be configured to transmit the message prior to transmitting the response to the client 502 (who generated the DNS request), at substantially the same time as the transmitting the response (e.g., concurrently), following transmitting the response, etc. In some embodiments, the processing engine 508 may be configured to buffer the message for sending at a later point in time (e.g., to reduce processing engine 508 to processing engine 508 traffic). For example, the processing engine 508 may be configured to queue the message in a buffer to be sent in a batch (e.g., with data corresponding to other record object) following lapse of a predetermined duration (e.g., every five minutes, every 15 minutes, every 30 minutes, every hour, every day, etc.).

The processing engines 508 may be configured to receive messages from other processing engines 508 within the distributed DNS processing engine system 504. The processing engines 508 may be configured use the messages for updating their respective cache 510. As such, the processing engines 508 may leverage DNS records received by other processing engine 508 within the distributed processing engine system 508 for updating their own cache 510. For example, a processing engine 508 (e.g., a first processing engine 508(1)) may be configured to receive a message from another processing engine 508 (e.g., a second processing engine 508(2)). The first processing engine 508(1) may be configured to store data corresponding to the message in cache 508(1). The first processing engine 508(1) may thus store data in cache 510(1) corresponding to a DNS record received by the second processing engine 508(2).

The processing engines 508 may be configured to use data in cache 510 (e.g., data corresponding to DNS records received by the processing engine 508 itself and data corresponding to DNS records received by other processing engines 508) for responding to subsequent DNS requests from clients 502. The processing engines 508 may receive subsequent DNS requests for a domain corresponding to a DNS record previously received by a processing engine 508 within the distributed DNS processing engine system 504. The processing engines 508 may be configured to respond to such DNS requests using data from cache 510 (as opposed to sending a DNS query and waiting for a response from the DNS controller 506). For example, the processing engines 508 may be configured to perform a look-up function using data from the DNS request in cache 510 to determine whether data corresponding to the DNS request is included in the cache 510. Where such data is included in the cache 510, the processing engine 508 may be configured to generate a response using the data from cache 510. Where such data is not included in the cache 510, the processing engine 508 may be configured to generate a DNS query for the DNS controller 506, as described above. In some embodiments, the processing engine 508 may be configured to perform one or more subsequent look-ups in cache 510 while awaiting a response from the DNS controller 506 (e.g., to determine whether another processing engine 508 within the distributed DNS processing engine system 504 broadcasted a message corresponding to the DNS request). In some embodiments, the processing engine 508 may be configured to perform a subsequent look-up in cache 510 in response to receiving a response from the DNS controller 506 (e.g., including the DNS record corresponding to the request). In other words, receiving the DNS record from the DNS controller 506 may trigger the processing engine 508 to perform a look-up in cache 510 (rather than processing the response from the DNS controller 506). For example, the processing engine 508 may receive a message from another processing engine 508 while waiting for a response from the DNS controller 506. The processing engine 508 may save processing or computing resources by performing a look-up prior to processing the response from the DNS controller 506. Such embodiments may expedite responses to the DNS requests from the clients 502 as well as conserve computing resources by leveraging data from other processing engines 508 and using received responses from the DNS controllers 506 as a trigger for performing subsequent look-ups in cache 510.

In some embodiments, the processing engines 508 may be configured to update their cache 510 corresponding to a domain. For example, and as described above, the processing engines 508 may be configured to store data in cache 510 for an expiry interval (e.g., a TTL value). The processing engines 508 may be configured to update the cache 510 corresponding to the domain prior to the data corresponding to the DNS record approaching the expiry interval. The processing engine 508 may be configured to generate another DNS query corresponding to the DNS record in cache 510 for the DNS controller 506 (e.g., similar to the initial DNS query used to receive the DNS record). The processing engine 508 may be configured to transmit the DNS query to the DNS controller 506 and receive an updated DNS record. The processing engine 508 may be configured to store the updated DNS record in cache 510 (e.g., supplemental to the previous DNS record, in replacement of the previous DNS record, etc.). In some embodiments, the processing engine 508 may be configured to generate additional messages corresponding to the updated DNS record for other processing engines 508 (such that the other processing engines 508 update their cache 510 prior to the expiry interval). Such embodiments may increase consistency of the cache 510 across the processing engines 508, as well as reducing bandwidth by limiting the likelihood of independently updating cache 510.

In some embodiments, some processing engines 508 may be configured to delete, erase, scrub, or otherwise remove some data from cache 510. For example, a processing engine 508 may be configured to remove data corresponding to DNS records which were not accessed by any clients 502. For example, a particular processing engine 508 may remove data corresponding to a DNS record from cache 510 where the processing engine 508 did not receive any DNS requests for the domain corresponding to the DNS record between a time at which the processing engine 508 received the DNS record (e.g., either via a message from another processing engine 508 or from the DNS controller 506) and a time at which the DNS record expires (e.g., based on the TTL value). Such embodiments may limit the amount of resources/memory consumed by the processing engines 508. In some instances, the processing engine 508 may be configured to receive a message from another processing engine 508 including data corresponding to the DNS record which was previously removed from cache 510. The processing engine 508 may be configured to save data corresponding to the DNS record in cache 510. Such embodiments ensure that cache 510 across the distributed DNS processing engine system 504 is consistent, while resource and memory consumption is reduced overall.

In some embodiments, new processing engines 508 may be introduced into the distributed DNS processing engine system 504. Where a new processing engine 508 is added to an existing distributed DNS processing engine system 504, the new processing engine 508 may not have any data stored in cache 510. Therefore, in some arrangements, a new processing engine 508 may generate DNS queries for the DNS controller 506 for DNS records which are saved in cache of other processing engines 508. Similarly, the new processing engine 508, upon receiving a DNS response from the DNS controller 506, may broadcast messages of all DNS records to other processing engines 508 even though such processing engines 508 may have records in their cache 510. In some embodiments, to avoid unnecessarily generating DNS queries and broadcasting unnecessary messages, where a new processing engine 508 is added to the distributed DNS processing engine system 504 (prior to the new processing engine 508 going live), an active processing engine 508 within the distributed DNS processing engine system 504 may be configured to generate and send a sync message (e.g., a unicast DNS message, for example) to each of the processing engines 508 within the system 504 (including the new processing engine 508). The processing engines 508 may each sync such that the cache 510 in each of the processing engines 508 is consistent. Such implementations and embodiments may ensure that that DNS controller 506 receives only "fresh" DNS queries from new processing engines 508.

Figure 6:
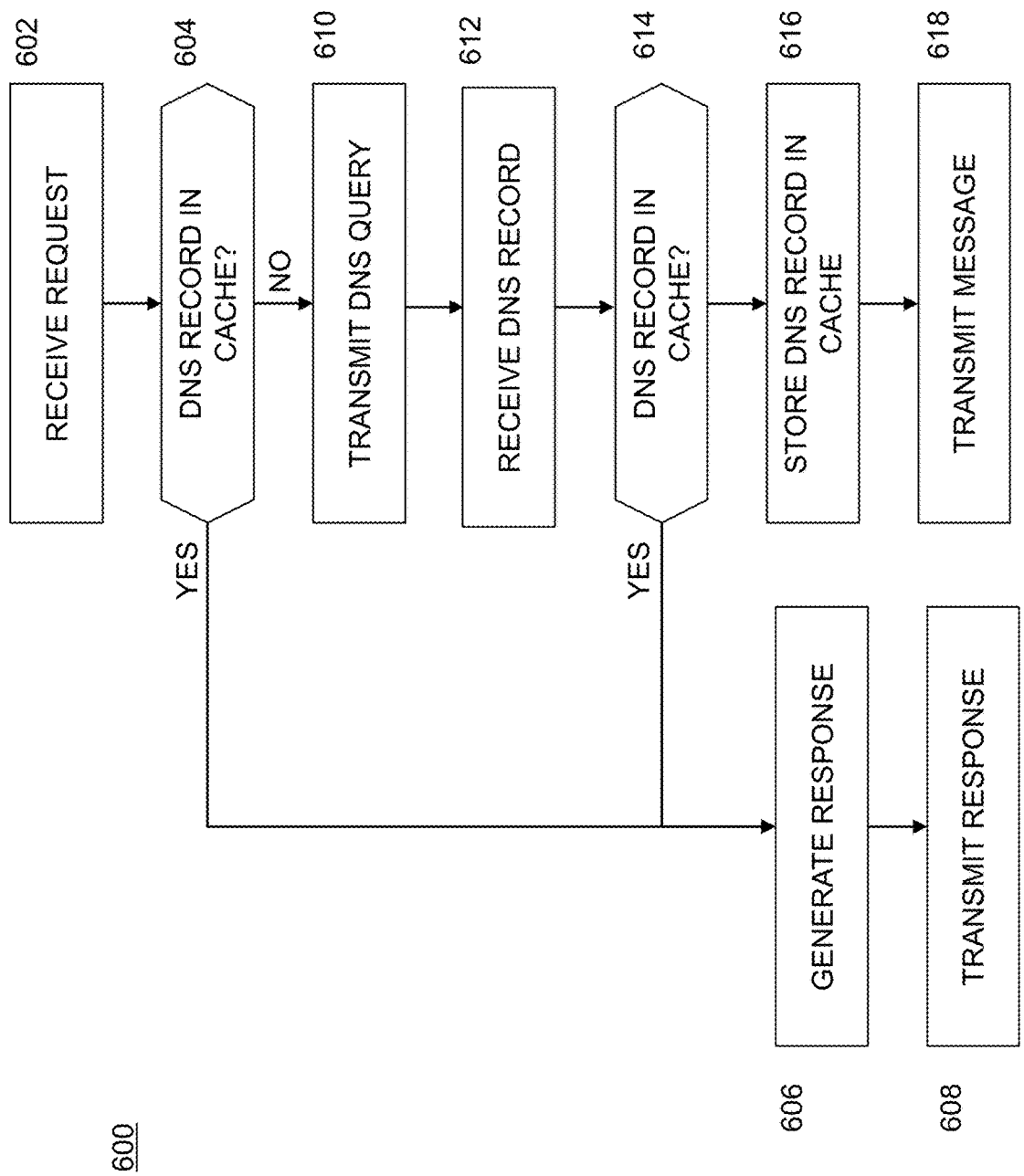
FIG. 6 is a flow diagram of a method for DNS caching in a distributed DNS processing engine, in accordance with an illustrative embodiment.

Referring to FIG. 6, depicted is a flowchart showing a method 600 for DNS caching in a distributed DNS processing engine, according to an illustrative embodiment. The method 600 (including various steps included therein) may be implemented by one or more of the components shown in FIG. 5 and described above, such as the processing engines 508, the client(s) 502, the DNS controller 506, etc. As a brief overview, at step 602, a first processing engine receives a request. At step 604, the first processing engine determines whether a DNS record is in cache. At step 606, the first processing engine generates a response and, at step 608, the first processing engine transmits the response. At step 610, the first processing engine generates a query. At step 612, the first processing engine receives the DNS record. At step 614, the first processing engine determines whether the DNS record is in cache. At step 616, the first processing engine stores the DNS record in cache. At step 618, the first processing engine transmits a message.

At step 602, and in some embodiments, a first processing engine receives a request. In some embodiments, the first processing engine may receive the request. The request may be a domain name service (DNS) request for accessing a domain. The client may generate the DNS request for the first processing engine responsive to a user of the client requesting to access a website, webpage, application, or other service (e.g., on the client). The client may transmit the DNS request to the first processing engine to identify a DNS record corresponding to the DNS request. The client may transmit the DNS request to the first processing engine based on the first processing engine being associated with the client, based on the first processing engine being in closest proximity to the client, etc. The first processing engine may receive the DNS request from the client.

At step 604, and in some embodiments, the first processing engine determines whether a DNS record is in cache. In some embodiments, the first processing engine may determine whether a DNS record corresponding to the DNS request is in cache of the first processing engine. The first processing engine may determine whether a DNS record is in cache by performing a look-up using data corresponding to the domain in cache to determine if data corresponding to the DNS record for the domain (e.g., corresponding to the DNS request) was received from one of the second processing engines (or was previously received from the DNS controller based on a request from the same or a different client).

In some embodiments, a DNS record may be in cache of the first processing engine based on a DNS request received by the first processing engine from a different client. For example, the client which generated the request (e.g., received at step 602) may be a first client. The first processing engine may receive a second DNS request from a second client to access a domain (e.g., corresponding to a DNS record stored in cache of the first processing engine). The first processing engine may perform a look-up in cache of the first processing engine (e.g., using a URL, a domain name, a host name, etc. as included in the DNS request) to identify the DNS record for the domain. The first processing engine may transmit the DNS record for the domain to the second client.

In some embodiments, the DNS record may be in cache of the first processing engine based on a message from a different processing engine of the distributed processing engine system. For example, the first processing engine may receive a broadcast message including data corresponding to a DNS record of a domain. The first processing engine may store the data corresponding to the DNS record in the cache of the first processing engine. The processing engine may subsequently receive a DNS request to access the domain. The processing engine may perform a look-up using data from the DNS request in cache to identify the DNS record, and may transmit the DNS record to the client which transmitted the DNS request.

At step 606, and in some embodiments, the first processing engine generates a response and, at step 608, the first processing engine transmits the response. In some embodiments, the first processing engine generates the response to include data corresponding to the DNS record from the DNS controller. The first processing engine may receive the DNS record directly from the DNS controller (e.g., because of a previous DNS query generated by the first processing engine), or indirectly from the DNS controller (e.g., because of a previous DNS query generated by a different processing engine). In some embodiments, the first processing engine generates the response to include data corresponding to the DNS record (the IP address corresponding to the domain from the request, for example). The first processing engine may transmit the response (e.g., data corresponding to the DNS record from the DNS controller) to the client (which generated the DNS request received at step 602). The client may use the response to access the website, webpage, application, service, etc. corresponding to the domain.

At step 610, and in some embodiments, the first processing engine generates a query. In some embodiments, the first processing engine generates a DNS query for a DNS controller based on the DNS request. In some embodiments, the first processing engine generates the DNS query where the first processing engine does not include a DNS record corresponding to the DNS request in cache. Hence, in some embodiments, where the first processing engine determines that a DNS record is not in cache (e.g., at step 604), the first processing engine may generate the DNS query for the DNS controller. The first processing engine may generate the DNS query based on the DNS request. In some embodiments, the DNS query may be substantially the same as the DNS request. In some embodiments, the DNS request may include data from the DNS request. For example, the first processing engine may extract data from the DNS request for generating the DNS query. The first processing engine may transmit the DNS query to the DNS controller for resolving the DNS query.

At step 612, and in some embodiments, the first processing engine receives the DNS record. In some embodiments, the first processing engine receives a DNS record corresponding to the domain from the DNS controller. The DNS record may include various fields, such as a header, a query, an answer, an authority, and/or an additional field. Of particular relevance, the answer field may include the IP address (or other address) corresponding to the server which hosts the domain. The additional field may include information or data corresponding to the domain (e.g., a domain name, a URL, a host name, etc.). In some embodiments, the method 600 may perform subsequent look-ups in cache while waiting for the DNS record from the DNS controller.

At step 614, and in some embodiments, the first processing engine determines whether the DNS record is in cache. Step 614 may be similar in some respects to step 604. For example, the first processing engine may perform a look-up in cache to determine if data corresponding to the DNS record for the domain was received from one of the second processing engine in response to (or prior to) receiving the DNS record from the DNS controller. In some embodiments, In some embodiments, the first processing engine may determine whether the DNS record is in cache of the first processing engine prior to processing the DNS record received from the DNS controller (e.g., at step 612). Where the first processing engine determines the DNS record is in cache, the method 600 may proceed to step 606. On the other hand, where the first processing engine determines the DNS record is not in cache, the method 600 may proceed to step 616. In other words, the first processing engine may selectively process the data received from the DNS controller.

At step 616, and in some embodiments, the first processing engine stores the DNS record in cache. In some embodiments, the first processing engine may store data corresponding to the DNS record in cache of the first processing engine. The first processing engine may store a subset of the data included in the DNS record (e.g., the answer and additional field, for example) in cache. The first processing engine may store the DNS record in cache. The first processing engine may use the data stored in cache for responding to subsequent DNS requests for the domain. In some embodiments, the first processing engine may store the DNS record in cache indefinitely. In some embodiments, the first processing engine may store the DNS record in cache until an expiration period. The expiration period may be or correspond to a time-to-live (TTL) value set for the data in cache of the first record object. The first processing engine may remove the DNS record in cache following the expiration period. The first processing engine may update the DNS record in cache following the expiration period, as described in greater detail below.

In some embodiments, the first processing engine generates a message. The first processing engine may generate a message for other processing engines in the distributed processing engine system. The first processing engine may generate the message based on the DNS record for the domain. The first processing engine may generate the message to include the data from the DNS record for the domain. The first processing engine may generate the message to include a subset of the data from the DNS record for the domain (e.g., data from the answer and the additional fields of the DNS record).

At step 618, and in some embodiments, the first processing engine transmits a message. In some embodiments, the first processing engine transmits the message to a second processing engine. The message may be the message described above. Hence, the message include data corresponding to the DNS record for the domain. The first processing engine may transmit the message to the second processing engine to cause the second processing engine to store data corresponding to the DNS record in cache of the second processing engine. In some embodiments, the first processing engine may transmit the message to a plurality of second processing engines including the second processing engine. Hence, the first processing engine may transmit the message to each of the processing engines in the distributed processing engine system. Each of the processing engines may save data corresponding to the DNS record in their respective cache. Hence, the cache for each of the processing engines in the distributed processing engine system may be substantially the same.

In some embodiments, the processing engines may update their respective cache corresponding to a DNS record. The processing engines may update their respective cache upon the DNS record reaching an expiration time. As described in greater detail above, the processing engines may store the DNS record with a timestamp. The processing engines may determine an expiration time for a DNS record based on the timestamp. In some embodiments, the processing engines may determine the expiration time based on the timestamp and a TTL value for the DNS record. As the expiration time for the DNS record approaches, the processing engine having an earliest expiration time (meaning the processing engine received the DNS record from the DNS controller first) may generate and transmit a request to update the DNS record to the DNS controller. The processing engine may receive an updated DNS record corresponding to the domain from the DNS controller. The processing engine may store the updated DNS record in cache (e.g., as a supplement of the previous DNS record, in replacement of the previous DNS record, etc.). In some embodiments, the processing engine may broadcast a second message including data corresponding to the updated DNS record for the domain to the other processing engines to cause the processing engines to update their respective cache for the domain. As such, one processing engine may be responsible for updating the DNS record for a given domain.

In some embodiments, a processing engine may delete, purge, or otherwise remove data corresponding to a DNS record from cache. The processing engine may remove the data corresponding to the DNS record from cache based on the expiration time. For example, the processing engine may remove data corresponding to a DNS record which is not requested by a client during a period of time from which the DNS record is saved in cache and the expiration time (e.g., indicating that the DNS record is infrequently used by the clients). Nonetheless, another processing engine may receive a request for the removed DNS record from a client. That processing engine may subsequently update the DNS record, and broadcast a message to other processing engines (including the processing engine which removed the DNS record from cache). Accordingly, in some instances, a processing engine which initially generated a DNS query and received a DNS record from the DNS controller may subsequently remove the DNS record from its cache, and that same processing engine may receive an update for the removed DNS record from another processing engine (as that processing engine received DNS requests for the DNS record). Hence, responsibility for updating the DNS record may be shifted amongst the processing engines.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method, comprising:
 receiving, by a first processing engine from a client, a domain name service (DNS) request for accessing a domain;
 determining, by the first processing engine at a first time, responsive to receiving the DNS request, that a DNS record for the DNS request is not stored in cache of the first processing engine;
 transmitting, by the first processing engine, responsive to the determination at the first time, a DNS query to a DNS controller based on the DNS request;
 receiving, by the first processing engine from the DNS controller, a DNS record corresponding to the domain;
 determining, by the first processing engine at a second time, subsequent to transmitting the DNS query to the DNS controller and prior to storing data corresponding to the DNS record from the DNS controller in the cache, that the DNS record is not stored in the cache of the first processing engine;
 storing, by the first processing engine responsive to the determination at the second time, the data corresponding to the DNS record in the cache of the first processing engine; and
 transmitting, by the first processing engine to a second processing engine, a message including data corresponding to the DNS record for the domain, to cause the second processing engine to store data corresponding to the DNS record in cache of the second processing engine.

2. The method of claim 1, wherein transmitting the message comprises transmitting, by the first processing engine to a plurality of second processing engines including the second processing engine, the message including the data corresponding to the DNS record for the domain name, to cause each of the plurality of second processing engines to store data corresponding to the DNS record in cache of the respective second processing engine.

3. The method of claim 1, further comprising transmitting, by the first processing engine, data corresponding to the DNS record from the DNS controller to the client.

4. The method of claim 1, wherein the client is a first client, the method further comprising:
 receiving, by the first processing engine from a second client, a second DNS request to access the domain;
 performing, by the first processing engine, a look-up in the cache of the first processing engine to identify the DNS record for the domain; and
 transmitting, by the first processing engine to the second client, the DNS record for the domain.

5. The method of claim 1, wherein the domain is a first domain, the method comprising:
receiving, by the first processing engine from the second processing engine, a broadcast message including data corresponding to a second DNS record for a second domain; and
storing, by the first processing engine, the data corresponding to the second DNS record in the cache of the first processing engine.

6. The method of claim 5, wherein the client is a first client, the method further comprising:
receiving, by the first processing engine from a second client, a DNS request to access the second domain;
performing, by the first processing engine, a look-up in the cache of the first processing engine, to identify the second DNS record for the second domain; and
transmitting, by the first processing engine, the second DNS record to the second client.

7. The method of claim 1, wherein the first processing engine stores the DNS record with a timestamp, and wherein the method further comprises:
determining, by the first processing engine, an expiration time for the DNS record based on the timestamp;
transmitting, by the first processing engine to the DNS controller, a request to update the DNS record based on the expiration time;
receiving, by the first processing engine from the DNS controller, an updated DNS record corresponding to the domain; and
storing, by the first processing engine, the updated DNS record in cache.

8. The method of claim 7, wherein the message is a first message, the method further comprising:
broadcasting, by the first processing engine to the second processing engine, a second message including data corresponding to the updated DNS record for the domain, to cause the plurality of second processing engines to store the updated DNS record in cache.

9. The method of claim 1, wherein the first processing engine stores the DNS record with a timestamp, and wherein the method further comprises:
determining, by the first processing engine, an expiration time for the DNS record based on the timestamp;
removing, by the first processing engine, the DNS record from the cache of the first processing engine based on the expiration time;
receiving, by the first processing engine from the second processing engine, an updated DNS record corresponding to the domain; and
storing, by the first processing engine, the updated DNS record in cache.

10. The method of claim 1, further comprising:
performing, by the first processing engine in response to receiving the request, a look-up using data corresponding to the domain in cache, to determine if data corresponding to the DNS record for the domain was received from one of the second processing engines.

11. The method of claim 10, wherein the look-up is a first look-up, the method further comprising:
performing, by the first processing engine in response to generating the DNS query for the DNS controller, a second look-up in the cache to determine if data corresponding to the DNS record for the domain was received from one of the second processing engines in response to receiving the DNS record from the DNS controller.

12. A system, comprising:
a first processing engine of a distributed set of processing engines, the first processing engine configured to:
receive, from a client, a domain name service (DNS) request for accessing a domain;
determine, at a first time, responsive to receiving the DNS request, that a DNS record for the DNS request is not stored in cache of the first processing engine;
transmit, responsive to the determination and the first time, a DNS query to a DNS controller based on the DNS request;
receive, from the DNS controller, a DNS record corresponding to the domain;
determine, subsequent to transmitting the DNS query to the DNS controller and prior to storing data corresponding to the DNS record from the DNS controller in the cache, at a second time that the DNS record is not stored in the cache of the first processing engine;
store, responsive to the determination at the second time, data corresponding to the DNS record in cache of the first processing engine; and
transmit, to a second processing engine, a message including data corresponding to the DNS record for the domain name, to cause the second processing engine to store data corresponding to the DNS record in cache of the second processing engine.

13. The system of claim 12, wherein transmitting the message comprises:
transmitting, to a plurality of second processing engines including the second processing engine, the message including the data corresponding to the DNS record for the domain, to cause each of the plurality of second processing engines to store data corresponding to the DNS record in cache of the respective second processing engine.

14. The system of claim 12, wherein the client is a first client, and wherein the first processing engine is further configured to:
receive, from a second client, a second DNS request to access the domain;
perform a look-up in the cache of the first processing engine to identify the DNS record for the domain; and
transmit, to the second client, the DNS record for the domain.

15. The system of claim 12, wherein the domain is a first domain, and wherein the first processing engine is further configured to:
receive, from the second processing engine, a broadcast message including data corresponding to a second DNS record for a second domain; and
store the data corresponding to the second DNS record in the cache of the first processing engine.

16. The system of claim 15, wherein the client is a first client, and wherein the first processing engine is further configured to:
receive, from a second client, a DNS request to access the second domain;
perform a look-up in the cache of the first processing engine, to identify the second DNS record for the second domain; and
transmit the second DNS record to the second client.

17. The system of claim 12, wherein the first processing engine stores the DNS record with a timestamp, and wherein the first processing engine is further configured to:
determine an expiration time for the DNS record based on the timestamp in cache; and transmit, to the DNS controller, a request to update the DNS record based on the expiration time;

receive, from the DNS controller, an updated DNS record for the domain; and store the updated DNS record in cache.

18. The system of claim 17, wherein the message is a first message, and wherein the first processing engine is further configured to:

broadcast, to the second processing engine, a second message including data corresponding to the updated DNS record for the domain, to cause the plurality of second processing engines to store the updated DNS record in cache.

19. The system of claim 12, the first processing engine is further configured to:

perform, in response to receiving the request, a first look-up using data corresponding to the domain in cache, to determine if data corresponding to the DNS record for the domain was received from one of the second processing engines; and perform, in response to generating the DNS query for the DNS controller, a second look-up in the cache to determine if data corresponding to the DNS record for the domain was received from one of the second processing engines in response to receiving the DNS record from the DNS controller.

20. The system of claim 12, wherein the first processing engine stores the DNS record with a timestamp, and wherein the first processing engine is further configured to:

determine an expiration time for the DNS record based on the timestamp in cache;

remove the DNS record from the cache of the first processing engine based on the expiration time;

receive, from the second processing engine, an updated DNS record corresponding to the domain; and store the updated DNS record in cache.

\* \* \* \* \*